United States Patent [19]

Nishimura et al.

[11] Patent Number: 4,649,542
[45] Date of Patent: Mar. 10, 1987

[54] DIGITAL SIGNAL TRANSMISSION METHOD PROVIDING HIGH ERROR CORRECTION CAPABILITY

[75] Inventors: Keizo Nishimura, Yokosuka; Masaharu Kobayashi, Yokohama; Hiroo Okamoto, Yokohama; Takaharu Noguchi, Yokohama; Takao Arai, Yokohama; Toshifumi Shibuya, Yokohama, all of Japan

[73] Assignee: Hitachi, Ltd., Tokyo, Japan

[21] Appl. No.: 621,743

[22] Filed: Jun. 18, 1984

[30] Foreign Application Priority Data

Jun. 17, 1983 [JP] Japan .................. 58-107693

[51] Int. Cl.$^4$ .............................................. G06F 11/10
[52] U.S. Cl. ........................................ 371/39; 371/38
[58] Field of Search ................. 371/37, 39, 40, 38

[56] References Cited

U.S. PATENT DOCUMENTS

| | | | |
|---|---|---|---|
| 4,281,355 | 7/1981 | Wada et al. | 371/40 X |
| 4,330,860 | 5/1982 | Wada et al. | 371/39 X |
| 4,356,564 | 10/1982 | Doi et al. | 371/40 |
| 4,368,533 | 1/1983 | Kojima | 371/39 X |
| 4,393,502 | 7/1983 | Tanaka et al. | 371/40 |
| 4,398,292 | 8/1983 | Doi et al. | 371/39 |
| 4,413,340 | 11/1983 | Odaka et al. | 371/39 |
| 4,437,185 | 3/1984 | Sako et al. | 371/39 |
| 4,541,093 | 9/1985 | Furuya et al. | 371/40 |
| 4,546,474 | 10/1985 | Sako et al. | 371/39 |

Primary Examiner—Charles E. Atkinson
Attorney, Agent, or Firm—Antonelli, Terry & Wands

[57] ABSTRACT

A method of transmitting a digital signal in the form of successive signal frames containing codes for detecting and correcting errors of the digital signal for reducing degradation in the quality of the reproduced sound due to generation of the code errors in a digitized audio signal transmission system. An analog signal such as an audio signal is sampled and subjected to A/D conversion. The sample word thus obtained is divided into a plurality of symbol elements. Parity words for detecting and correcting code errors are added to every group of a predetermined number of the information symbols through an interleave procedure before being transmitted. The method includes the steps of applying a first frame of symbols, taken one from each input channel, and having a first arrangement state, to a first error-correcting code encoder to generate a series of first parity words; delaying each of the symbols in the first frame and each of the first parity words by a respective different delay time in a unit of the sample word at a delay line to provide a resulting second frame of symbols in a second arrangement state; applying the second frame of symbols to a second error-correcting code encoder to generate a series of second parity words; and transmitting said second frame of symbols together with said second parity words.

6 Claims, 12 Drawing Figures

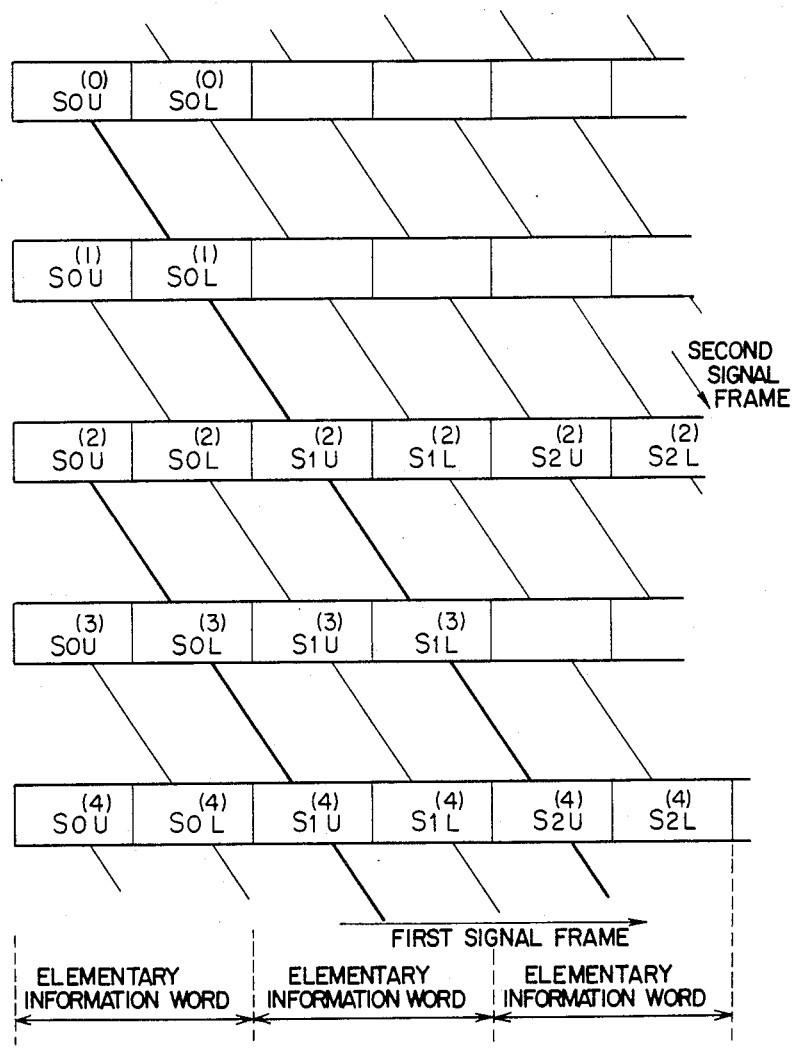

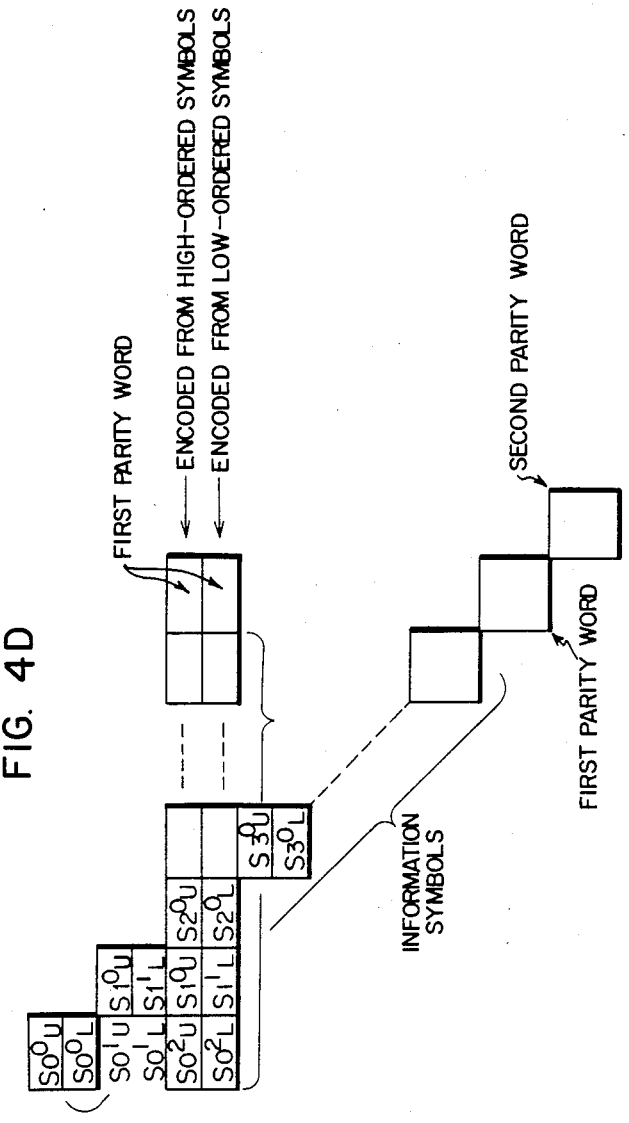
FIG. 4D
FIG. 4E

DIGITAL SIGNAL TRANSMISSION METHOD PROVIDING HIGH ERROR CORRECTION CAPABILITY

BACKGROUND OF THE INVENTION

The present invention relates in general to a digital signal code transmission method and in particular to a method of transmitting a digital signal arranged in a series of blocks or frames each including an error detection code and an error correction code in addition to information codes and which method is advantageously suited for protecting the quality of reproduced sound from degradation due to code errors in a system destined for transmitting or processing digital audio signals.

There is known a so-called compact disc signal system which represents a typical one of the type of signal transmission system in which a digital information word to be transmitted is divided into a plurality of information symbols and parity words for code error detection and code error correction are combined with every predetermined number of information symbols.

In the compact disc system, a digital information word is constituted by an audio signal sample quantized to 16 bits which are grouped into two information symbols one of which includes eight high-ordered (more significant) bits with the other including eight low-ordered (less significant) bits, to thereby constitute the error detecting code and the error correcting code. Generally, in the signal transmission system under consideration, four symbols of a Reed Solomon code destined primarily to be used for the correction of error are generated or created and added to 24 information symbols which include the high-ordered and low-ordered symbols in pairs for every information word of twelve samples.

Further, in the compact disc system, a first signal frame composed of 24 information symbols and four first parity symbols is subjected to an interleaving operation on a symbol basis, whereby a Reed Solomon code of four symbols to be used primarily for error detection is generated for 28 symbols in total including 24 information symbols and 4 first parity symbols derived from the first signal frames differing from one another and added as a second parity symbol, to thereby constitute a second signal frame. The signal sequence arranged in this manner is generally referred to as the cross interleave code. The Reed Solomon code has an error detecting and correcting capability. Thus, the signal reproduced by the compact disc system undergoes error detection by the second parity symbol for every second signal frame. Among the errors, those which are able to be corrected by using the second parity symbol naturally undergo correction. On the other hand, an error which can not be corrected is marked by a flag indicative of the presence of the symbol suffering the error.

Here, a brief elucidation will be made of the cross interleave code so as to provide a better understanding of the invention. FIG. 1 of the accompanying drawings is a schematic view for illustrating preparation of a cross interleave code, in which the numbers of input channels are taken along the ordinate with the serial numbers of the codes taken along the abscissa. As will be seen in the figure, the signal frames of the two varieties are prepared in the arrangement illustrated. More specifically, there are prepared a second signal or code frame consisting of information or data words $D_{0,0}$, $D_{1,1}$, $D_{2,2}$, $D_{3,3}$, $D_{4,4}$, $D_{5,5}$, $D_{6,6}$ and $D_{7,7}$ and check words $Q_{8,8}$ and $Q_{9,9}$ and a first signal or code frame consisting of information or data words $D_{4,0}$, $D_{4,1}$, $D_{4,2}$, $D_{4,3}$, $D_{4,4}$ and $D_{4,5}$ and check words $P_{4,6}$, $P_{4,7}$. In this case, only one word is permitted to make an appearance in duplicate in both the first and second code frames. By virtue of such arrangement, the errors of which correction is impossible in the second code frame such as, for example, $D_{0,0}$, $D_{2,2}$ and $D_{4,4}$ indicated by hatched areas can be corrected in the first code frames including $D_{0,0}$, $D_{2,2}$ and $D_{4,4}$ respectively. In this way, the error detection and correction of codes can be effected with a high efficiency. In case the Reed Solomon code is employed in the first and second code parts, the code which has undergone the cross interleave operation is referred to as the cross-interleave Reed Solomon code (CIRC).

A hitherto known interleave system for preparing the cross interleave code will be described.

First, an audio analog signal is quantized to a predetermined number of bits, e.g. 16 bits, at a predetermined sampling frequency, e.g. 44.1 kHz.

The 16-bit data thus obtained can be encoded in two ways. First, the 16-bit data can be encoded as it is. Second, the 16-bit data can be processed on the basis of a predetermined number of bits, e.g. 8 bits. In the instant description, it is assumed that the 16-bit data is divided into eight high-ordered (more significant) bits and eight low-ordered (less significant) bits, wherein the data of the eight high-ordered bits is represented by $S_U$ with the data of the eight low-ordered bits being represented by $S_L$. Further, the sequential orders of the data $S_U$ and $S_L$ are, respectively, represented by symbols $S_{iU}{}^j$ and $S_{iL}{}^j$, where i takes ordinal values of 0 to 5 for each value of j. For example, the data is in the order of $S_0{}^j$, $S_1{}^j$, $S_2{}^j$, $S_3{}^j$, $S_4{}^j$, $S_0{}^{j+1}$, $S_1{}^{j+1}$, and so on. Thus, $S_{iU}{}^j$ represents data comprising the i-th high-ordered bit of j-th group. An example of interleaving the codes of the data structure mentioned above is illustrated in FIG. 2 of the accompanying drawings.

Referring to FIG. 2, in the first coding, the data $S_{0U}{}^7$; $S_{0L}{}^7$, $S_{1U}{}^7$; $S_{1L}{}^7$; $S_{2U}{}^7$; $S_{2L}{}^7$, $S_{3U}{}^7$; $S_{3L}{}^7$, $S_{4U}{}^7$; $S_{4L}{}^7$, and $S_{5U}{}^7$; $S_{5L}{}^7$ are encoded as information words to generate or create the check words $P_0{}^7$, $P_1{}^7$, $P_2{}^7$ and $P_3{}^7$. For these words, interleave is effected in a sequence of $S_{0U}{}^0$, $S_{0L}{}^1$, $S_{1U}{}^2$, $S_{1L}{}^3$, $S_{2U}{}^4$, $S_{2L}{}^5$, $2_{3U}{}^6$, $S_{3L}{}^7$, $S_{4U}{}^8$, $S_{4L}{}^9$, $S_{5U}{}^{10}$, $S_{5L}{}^{11}$, $P_0{}^{12}$, $P_1{}^{13}$, $P_2{}^{14}$ and $P_3{}^{15}$. For the interleaved words, the error check code $CRC^{16}$ is generated through the second encoding.

By virtue of the interleave operation mentioned above, a succession of errors possibly generated in a second code frame in the course of recording and/or reproduction will be dispersed in the first code frame upon decoding thereof. Thus, the decoding of the second code frame can be accomplished with an improved efficiency.

However, if the error correction is rendered impossible due to a succession of errors involved in the interleave operation, the twelve data $S_{0U}{}^0$, $S_{0L}{}^1$, $S_{1U}{}^2$, $S_{1L}{}^3$, $S_{2U}{}^4$, $S_{2L}{}^5$, $S_{3U}{}^6$, $S_{3L}{}^7$, $S_{4U}{}^8$, $S_{4L}{}^9$, $S_{5U}{}^{10}$ and $S_{5L}{}^{11}$ become erroneous.

Describing a method of decoding the code series mentioned above, the individual signal symbols are rearranged to the structure of the second signal frame through deinterleaving, wherein the erroneous symbols remaining uncorrected are corrected with the aid of the first parity symbol. Further, by taking advantage of the error detecting capability of the Reed Solomon code, the erroneous symbols remaining undetected and/or erroneously corrected symbols still suffering error can be detected and corrected by resorting to the second parity symbols in many applications. In this manner, the data whose errors can not be corrected even by resorting to the first parity symbol are outputted together with the error detection flag constituted precedingly by the second parity symbol. Furthermore, when the error whose detection is missed by the second parity symbol is detected and found uncorrectable, a fresh error detection flag is added before being outputted.

The individual information symbols processed in the manner mentioned above are combined on a two-symbol basis so as to constitute the information words which are original audio signal samples and subjected to a digital-to-analogue (A/D) conversion to be outputted as the audio signal. At that time, if at least one of the symbols corresponding to the high-ordered and the low-ordered information words has an error detection flag attached thereto, error concealment is performed through a mean value interpolation or previous value holding (zero-th order interpolation) procedure with a view to preventing a click from being generated, to thereby minimize deterioration in the reproduced sound quality.

The system for performing detection and correction of code errors by dividing information word into a plurality of the symbols is advantageous in that the capability of error correction can be enhanced for a given code redundancy, and that the number of components, such as registers required for arithmetic operation for the error correction can be decreased. As a result the scale of the circuit can be correspondingly reduced, because the number of bits forming a signal word (symbol) to be processed as a basic element is small.

Next, consideration will be given to the concept elucidated above as applied to a system where the code error generated is of a burst nature as in the case of a digital audio recording/reproducing system employing a magnetic tape, by way of example. It is further assumed for purpose of illustration that a CRC code which is made use of in the error detection adopted in a PCM audio recorder using a VTR (video tape recoder) is utilized as the second parity word, and that a b-adjacent code is employed as the first parity word for the error correction. In the PCM audio recording apparatus using a VTR, six signal information words each of 14 bits are combined with two words of the b-adjacent code of 14 bits and subsequently subjected to an interleave operation so as to be combined with the CRC code of 16 bits. The signal which has undergone the error detection for every second signal frame with the aid of the CRC code is so as to be rearranged in the first signal frame. Since two words of the b-adjacent code are attached, it is possible to correct all the errors of two words within the first signal frame. More specifically, so far as the errors in the second signal frame are not more than two frames, the error in the first signal frame is less than two words, which means that all the errors can be corrected. However, in case the error is over three frames in the second signal frames, the errors included in the first signal frame will amount to three or more words, resulting in a word which is left uncorrectable.

Here, it is noted that by dividing the signal information word of 14 bits into two symbols each of 7 bits, four symbols of the b-adjacent code each of 7 bits are available for the same given redundancy. Similarly, when the CRC code of 16 bits is employed in the second signal frame, an equivalent error detection capability can be obtained. However, since the b-adjacent code of four symbols is capable of correcting errors up to four symbols, errors of less than four frames can be corrected in the second signal frames, increasing the error correcting capability.

In case each of the information symbols of the first frame comprises a combination of the high-ordered symbol and the low-ordered symbol of each information word as in the case of the code employed in the compact disc system, as shown in FIG. 3, there may arise uncorrectable errors of the information words for the reasons mentioned below. In FIG. 3, directions indicated by inclined or diagonal interconnecting lines indicate the second frames for error detection, while the first frames for error correction are arrayed in the horizontal direction. Each of the information words is constituted by two symbols, e.g. $S_{0U}^{(2)}$ and $S_{0L}^{(2)}$, $S_{1U}^{(2)}$ and $S_{1L}^{(2)}$, and so on.

It is assumed that, in a CRC code, errors are detected in the five second signal frames in which those symbols are placed which are to constitute the first signal frames such as $S_{0U}^{(4)}$, $S_{0L}^{(4)}$, $S_{1U}^{(4)}$, $S_{1L}^{(4)}$, $S_{2U}^{(4)}$, $S_{2L}^{(4)}$ and so on, inclusive of the second signal frame of $S_{0U}^{(2)}$, $S_{0L}^{(3)}$, $S_{1U}^{(4)}$ and so on and the second signal frame of $S_{0U}^{(0)}$, $S_{0L}^{(1)}$, $S_{1U}^{(2)}$, $S_{1L}^{(3)}$, $S_{2U}^{(4)}$ and so on, and that an error is found in the four second frames in which those symbols have been placed which constitute the first signal frame of $S_{0U}^{(0)}$, $S_{0L}^{(0)}$ and so on. On these assumed conditions, in the two first signal frames $S_{0U}^{(0)}$ and $S_{0U}^{(1)}$, respectively, correction can be made as the error is of four symbols. However, in the three first signal frames comprising $S_{0U}^{(2)}$, $S_{0U}^{(3)}$ and $S_{0U}^{(4)}$, respectively, five symbols suffer errors which are thus uncorrectable. As a consequence at least the six symbols $S_{0U}^{(2)}$, $S_{1U}^{(2)}$, $S_{0L}^{(3)}$, $S_{1L}^{(3)}$, $S_{1U}^{(4)}$ and $S_{2U}^{(4)}$ shown in FIG. 3 are outputted as the uncorrectable symbols. Besides, many of the symbols (not shown) within the three second signal frames also suffering an error will be outputted as uncorrectable symbols. The individual information words containing these symbols are processed as error information words which are concealed when they are outputted. So far as only the portion illustrated in FIG. 3 is concerned, errors of six symbols will give rise to six error-concealed words inclusive of one word of $S_{0U}^{(2)}$ and $S_{0L}^{(2)}$. These error-concealed words also provide a cause for generation of distortion in the reproduced signal in the digital audio system and involves deterioration in the quality of reproduced sound, in case the error-concealed words amount to a non-negligible number. The prior art systems described above are disclosed, for example, in the Odaka et al U.S. Pat. No. 4,413,340 issued Nov. 1, 1983 (corresponding to G.B. Patent No. 2,076,569A and the DE-OS No. 3,119,669) and Doi et al's U.S. Pat. No. 4,355,392 issued Oct. 19, 1982.

SUMMARY OF THE INVENTION

It is therefore an object of the present invention to solve the problems of the prior art systems described above and to provide a digital signal transmission system in which the number of uncorrectable information words which are subject to error-concealment can be reduced to a minimum, while assuring the advantages of the prior art system attained in respect to the error correction capability and the scale of the decoding circuit owing to the processing of the information words which are divided into symbols.

As described hereinbefore in conjunction with the hitherto known system, in which the information word to be processed undergoes division on a symbol basis, the symbol which is ultimately outputted as the uncorrectable symbol is the symbol for which error is detected by the preceding second parity word, which error can not be corrected by the succeeding first parity word.

Accordingly, it is taught by the present invention that the group of the information symbols which constitute the second parity word for error detection be so arranged that all of the symbols derived from division of one information word are included in the aforementioned information symbol group. When error is detected on a particular symbol resulting from division of a given information word, the other symbol resulting from the division is also determined to be erroneous, because the latter is present within the same second frame. In the case of the example illustrated in FIG. 3, the symbols of 14 information words are included in the second signal frame. Thus, the number of symbols which are subject to correction can be reduced to a number which corresponds to seven information words. In this way, the number of information words which are subject to correction can be reduced according to the teaching of the invention.

Furthermore, a set of the first parity symbols can be prepared on the basis of one of the grouped or classified symbols, e.g. the group of high-ordered symbols in the case of the example illustrated in FIG. 3, while a further set of the first parity symbols can be constituted by the group of the low-ordered symbols. Then, the correction capability to the same degree can be obtained as in the case of the word processing involving no word division procedure. Besides, the scale of the decoding circuit can be reduced by a proportion corresponding to the reduction in the number of bits to be processed as the information elements by the encoder. Finally, the number of the information words which are to be concealed can also be reduced.

BRIEF DESCRIPTION OF THE DRAWINGS

The above and other objects, features and advantages of the invention will become more apparent upon consideration of the following detailed description made in conjunction with the accompanying drawings, in which:

FIGS. 1 to 3 are views for illustrating uncorrectable instances in hitherto known digital signal arrangements;

FIGS. 4A to 4E are views for illustrating methods of encoding digital signals according to the invention;

DESCRIPTION OF THE PREFERRED EMBODIMENT

Before entering into a description of the exemplary embodiments of the invention, the basic concept underlying the invention will be elucidated by referring to FIGS. 4A to 4E.

Figure 4A:
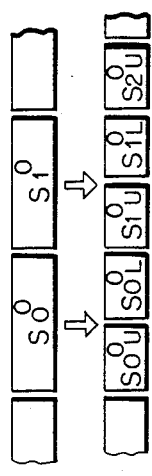
Figure 4B:
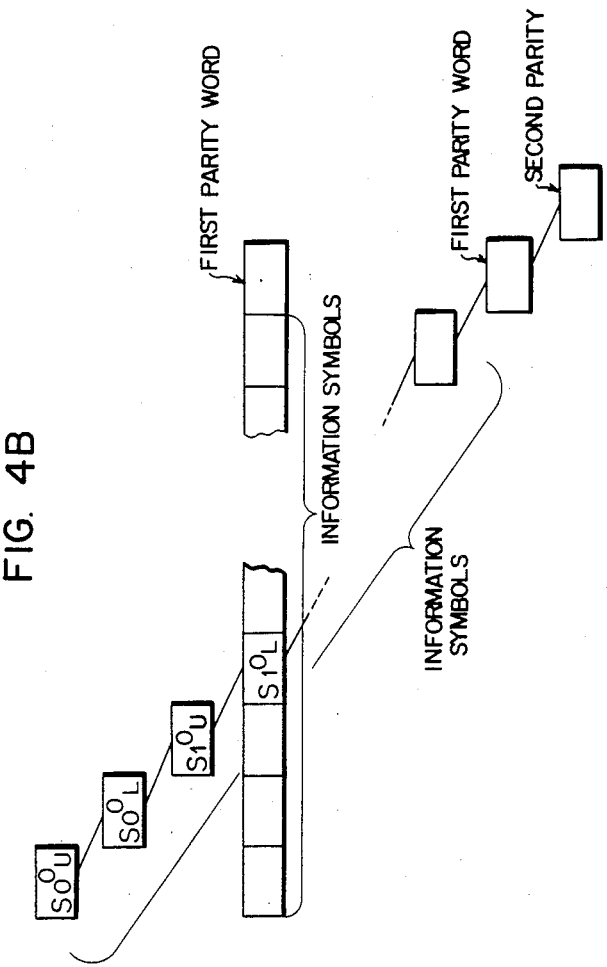

As described hereinbefore, a digital information word ($S_i$) is constituted by a plurality of symbols ($S_{iU}^j$, $S_{iL}^j$), as illustrated in FIG. 4A. According to the teaching of the invention, the plurality of symbols resulting from division of the same digital information word and constituting a first parity word are subsequently included in the same information symbol group for constituting a second parity word (FIG. 4B).

Figure 1:
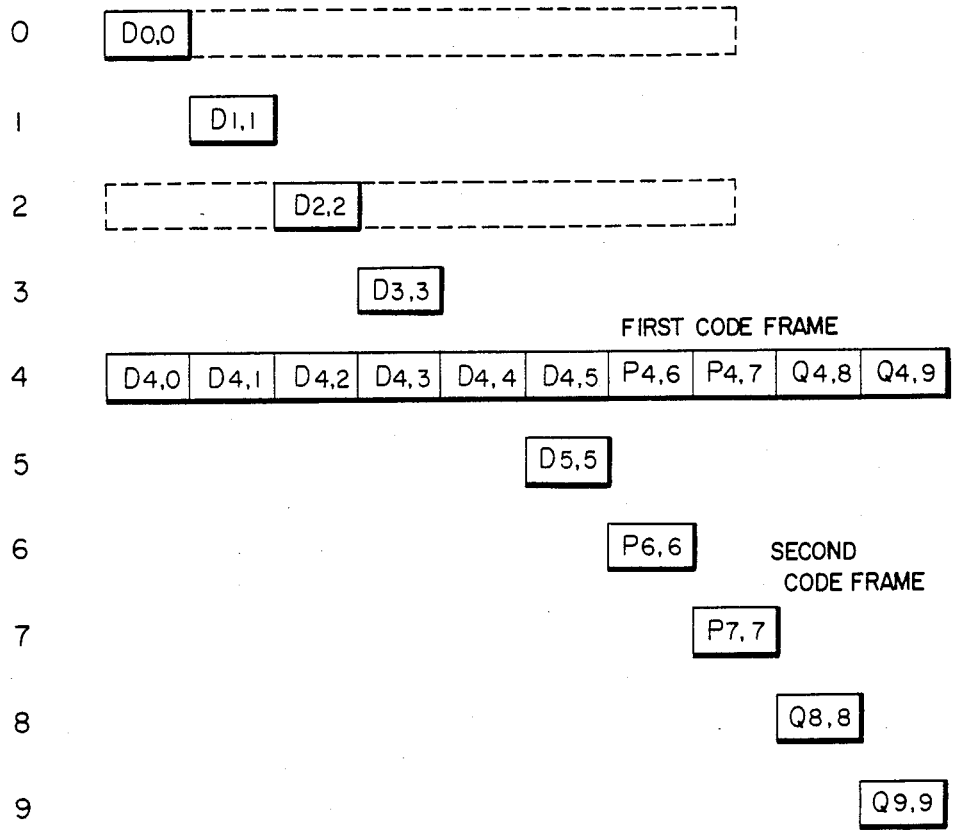
Figure 2:
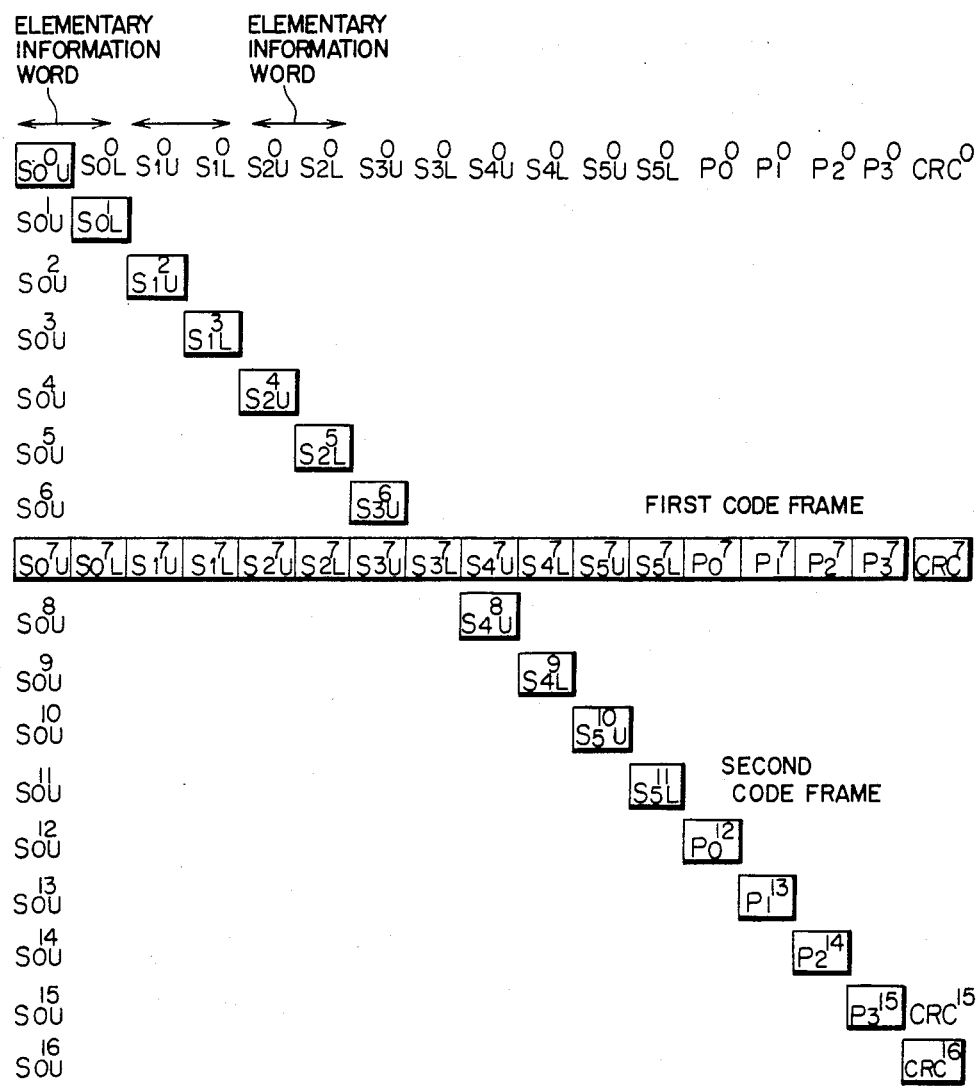
Figure 4C:
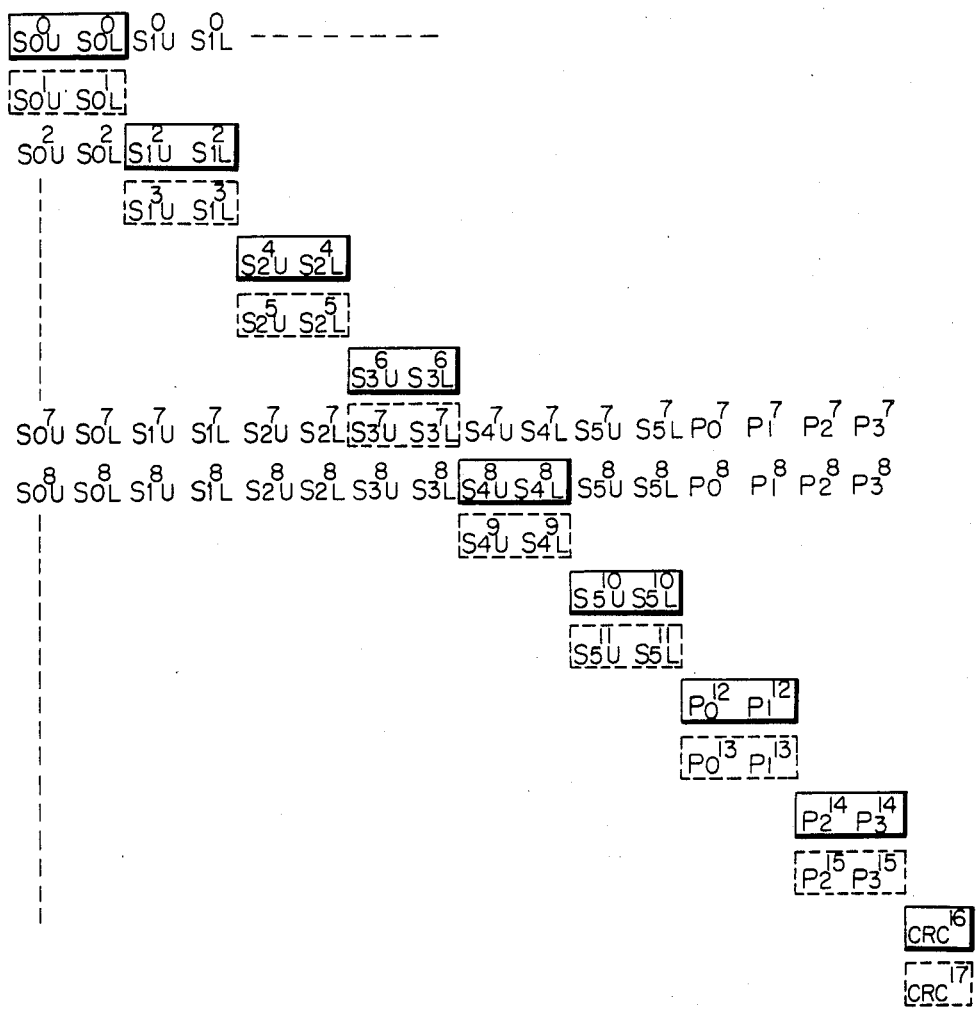

By way of example, let's consider the words ($S_{0U}^0$, $S_{0L}^0$), ($S_{1U}^2$, $S_{1L}^2$), ($S_{2U}^4$, $S_{2L}^4$), ($S_{3U}^6$, $S_{3L}^6$), ($S_{4U}^8$, $S_{4L}^8$), ($S_{5U}^{10}$, $S_{5L}^{10}$), ($P_0^{12}$, $P_1^{12}$), and ($P_2^{14}$, $P_3^{14}$) shown in FIG. 4C. In this case, when error takes place in this first code frame and is found uncorrectable, the six data provided by the above mentioned words will be rendered erroneous, as will be understood by recalling the case illustrated in FIG. 2. In other words, the number of words which are rendered uncorrectable due to generation of the burst error is reduced to a half as compared with the hitherto known interleave method.

FIG. 4D illustrates a mode for carrying out the invention in which the first parity word is created by high-ordered information symbols or low-ordered information symbols, while FIG. 4E shows a mode of implementation in which the first parity word is prepared by the high-ordered symbol and the low-ordered symbol which constitute a same information word.

Now, an embodiment of the invention will be described.

Figure 5:
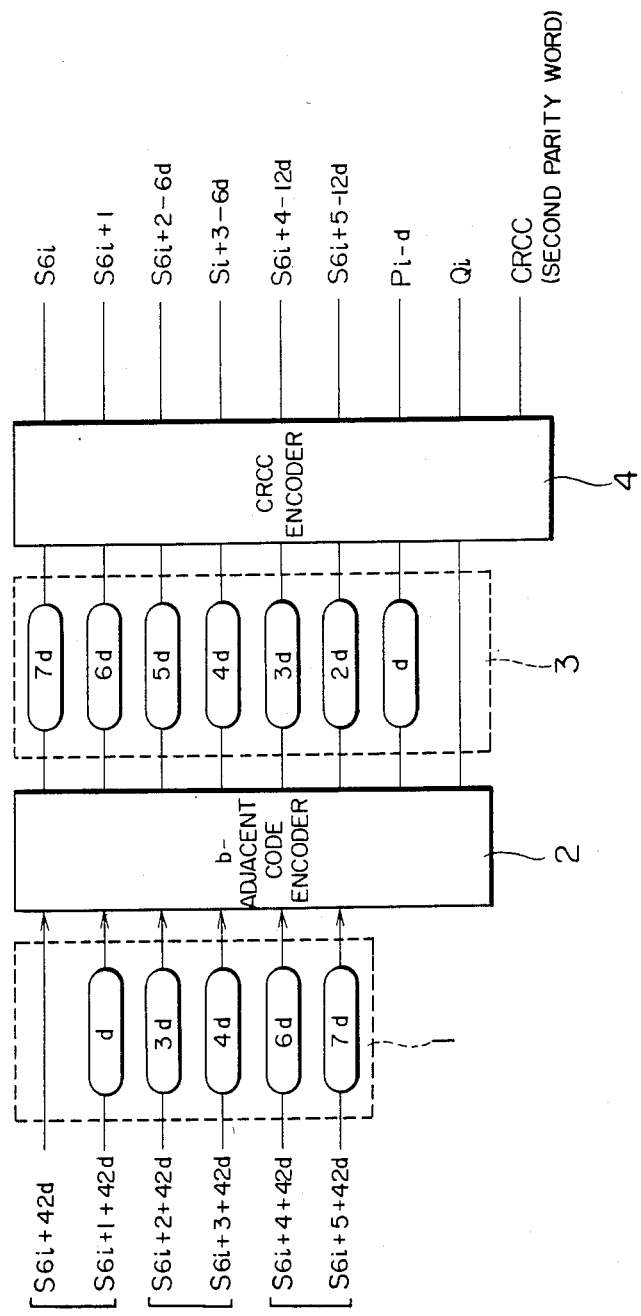
FIG. 5 is a block diagram showing a digital signal encoding system for carrying out the method according to the invention.

FIG. 5 shows in a block diagram a signal encoding system which is operative with such a signal arrangement that an information word is divided into two symbols. By way of example, when one information word is composed of 16 bits, one of the symbols is constituted by eight high-ordered (more significant) bits with the other being constituted by the eight low-ordered (less significant) bits. A first signal frame is constituted by six information symbols resulting from the division of the information words to which are added a first parity word for error correction which comprises two symbols of b-adjacent codes (e.g. 16 bits in case an information symbol is composed of eight bits). This signal frame which contains eight symbols in total inclusive of the information symbols and the parity symbols is interleaved and a CRC code (e.g. of 16 bits) is added thereto as a second parity word for error detection, to thereby constitute a second signal frame. In FIG. 5, numerals 1 and 3 denote delay circuits, respectively, 2 denotes a b-adjacent code generating circuit, and 4 denotes a CRC code generating circuit.

The delay circuit 1 has the input supplied with six information symbols resulting from the division of each of three time-serial successive information words into two symbols for the data of one frame on a frame basis. In the case of the embodiment being described, it is assumed for purpose of illustration that the input signal is derived by sampling the audio signal of one channel, although the invention can be equally applied to a stereo audio system where signals of two channels and eventually other channel signals are to be dealt with or a system destined to process other signals than the audio signal. Besides, variations in the number of data contained in one frame as well as delay amounts may be made to comply with actual applications without departing from the spirit and scope of the invention. The signals outputted by the delay circuit and including the symbols delayed by mutually different amounts, respectively, are supplied to the b-adjacent code generating circuit 2 for creating the symbols P and Q of the first parity word, to thereby constitute the first signal frame. Subsequently, all the symbols inclusive of the parity word symbols P and Q are delayed, respectively, by amounts differing from one another on a symbol basis in the delay circuit 3, to thereby prepare a combination of the symbols which differs from that of the first signal frame, which combination is subsequently supplied to the CRC code generating circuit 4 where the CRC code is generated and added as the second parity word, resulting in the generation of the second signal frame to be outputted. The amounts of delay imparted to the individual symbols, respectively, in the circuit 1 are selected in consideration of the amounts of delay imparted by the delay circuit 3 so that the individual information words within the second frame are not continuous in the time-serial sequence, with a view to preventing occurrence of a situation in which the errors detected in the second signal frame are concealed successively in the time-serial sequence when these errors are found uncorrectable by the first parity symbol of the first signal frame. Through this measure, the quality of the reproduced audio signal can be positively protected against degradation. Accordingly, in a system where the time-serial information is allowed to be successively concealed or outputted in an erroneous state, the delay amounts may differ from the values exemplified in FIG. 5 and may be values which can compensate the delay amounts imparted by the delay circuit 3. In the case of the embodiment shown in FIG. 5, the individual delay amounts are selected to be different from one another on a symbol-by-symbol basis. However the delay amounts may be so selected that they differ on an information-word basis, if the error correction capability of the first parity symbol allows it. Besides, the delays imparted to the individual symbols (or individual information words) by the delay circuit 3 are not restricted to the values exemplified in FIG. 5 so far as the delays are different for all the symbols (or information words), respectively.

Figure 6:
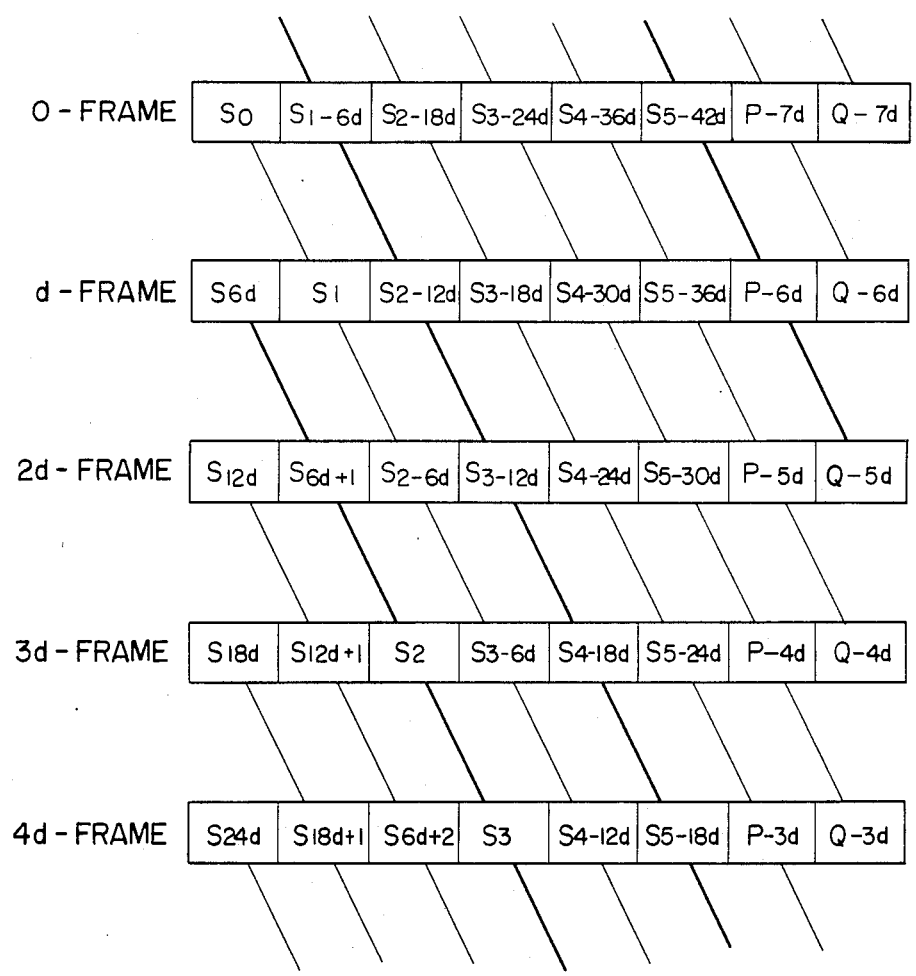
FIG. 6 is a view for illustrating uncorrectable instances in the encoding system shown in FIG. 5.

Next, effects or advantages provided by the embodiment shown in FIG. 5 will be elucidated by referring to FIG. 6. In the case of the embodiment shown in FIG. 5, the b-adjacent code of two symbols is used as the first parity symbols. As a result, the errors of at least two symbols of the first signal frame can be corrected with the aid of the first parity symbols. In FIG. 6, the second signal frames include, respectively, the symbols interlinked by the diagonal lines, respectively, for detecting an error with the aid of the CRC code, while the first frames for error correction by resorting to the use of the b-adjacent code are arrayed horizontally. Next, a situation in which the detected error can not be corrected by the b-adjacent code will be considered on the assumption that an error is detected in three second signal frames, i.e. a second signal frame including symbols $S_{6d}$, $S_{6d+1}$, $S_2$, $S_3$ and so on, a second signal frame including $S_{1-6d}$, $S_{2-12d}$, $S_{3-12d}$, $S_{4-18d}$, $S_{5-18d}$ and so on, and a second signal frame including $S_{5-42d}$, $P_{-6d}$, $Q_{-5d}$ and others not shown.

On this assumption, the error which can not be corrected will be of the four symbols $S_{6d}$, $S_{1-12d}$, $S_{6d+1}$ and $S_{3-12d}$ included in the two first signal frames identified by d-frame and 2d-frame in FIG. 6 and each suffering errors of three symbols. In this connection, it should be noted that the symbols $S_{6d}$ and $S_{6d+1}$ result from the division of the same information word while the symbols $S_{2-12d}$ and $S_{3-12d}$ are produced by the division of another information word. In other words, the correction incapability of four symbols means that only two information words can not be corrected, which in turn means that the number of the information words to be interpolated or likewise concealed is reduced. In this manner, the number of the information words which are to be concealed can be reduced in are probability when compared to the number of the uncorrectable symbols.

In the embodiment described above, it has been assumed that the b-adjacent code and the CRC code are made use of as the parity words. It should however be understood that a similar effect can be attained by using a combination of other codes. For example, a combination including the Reed Solomon code used in the compact disc system is effective for correction of an error of a burst nature. Further, the invention can be effectively and satisfactorily applied to the system in which the error pattern is random such as a burst error due to a step-out of synchronism.

Figure 7:
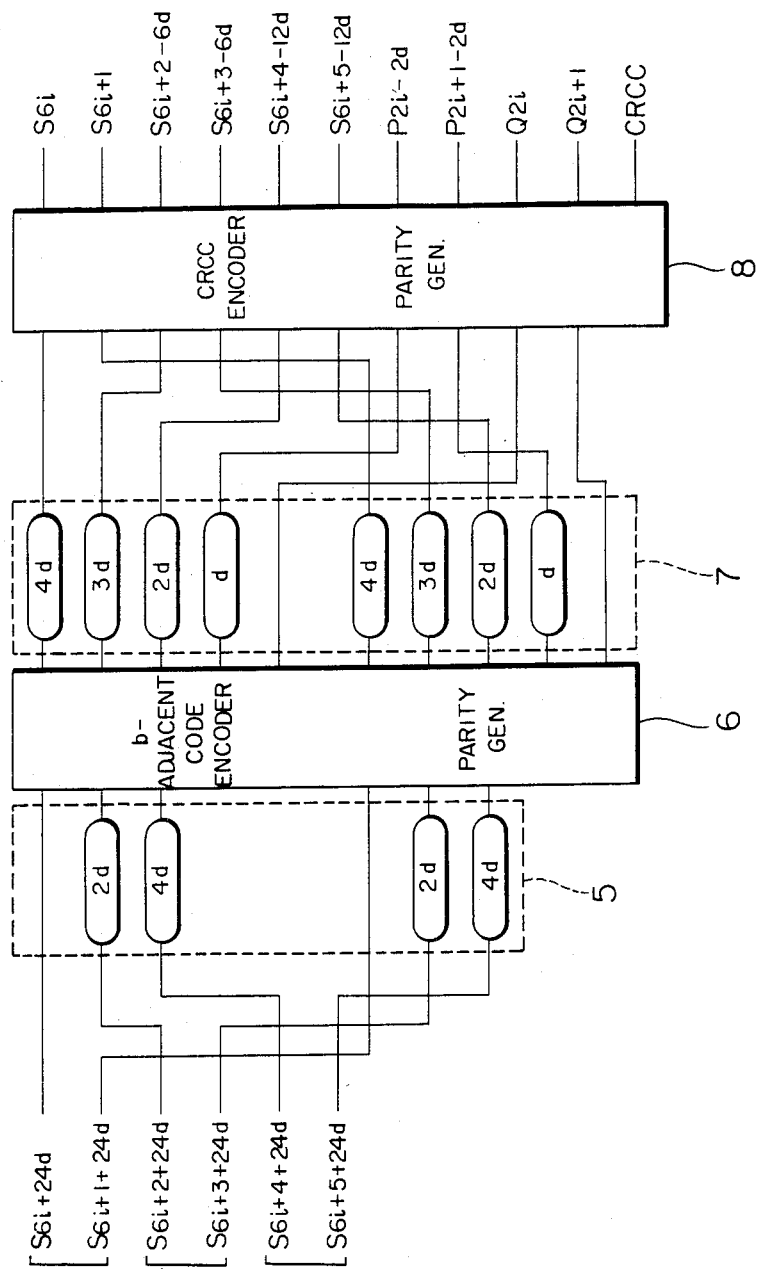
FIG. 7 is a block diagram showing a digital signal encoding system according to another embodiment of the present invention.

FIG. 7 shows another embodiment of the invention which will be described below by also referring to FIG. 8. According to this embodiment, an information word is divided into a plurality of symbols each of which then has a parity word for error correction attached hereto, to thereby constitute a signal frame. More specifically, three information words are each divided into a high-ordered symbol and a low-ordered symbol, wherein b-adjacent code parities of two symbols are generated in one-to-one correspondence only for the three high-ordered information symbols while the b-adjacent code parities of two symbols are generated for the three low-ordered symbols, to thereby constitute a first signal frame which is then interleaved and the CRC codes for error detection in correspondence to the respective parity symbols are attached thereto, whereby a second signal frame is constituted. In FIG. 7, reference numerals 5 and 7 denote delay circuits, 6 denotes an error correcting b-adjacent code generator circuit, and 8 denotes a CRC code generating circuit.

The delay circuit 5 has an input supplied on a frame basis with six information symbols resulting from the division of three time-serially successive information words each divided into two symbols, i.e. high-ordered and low-ordered symbols. In the delay circuit 5, the high-ordered symbol and the low-ordered symbol of the same information word are delayed by an equal amount, while values of delays imparted to the symbols are differentiated from one to another information word so that the individual information words are not arranged successively in the time-serial sequence within the second signal frame. The delay amounts in concern may be set to such values which compensate for the delays in the delay circuit 7 of the succeeding stage in dependence on the type of system to which the invention is applied, as in the case of the embodiment shown in FIG. 5.

The individual symbols transmitted through the delay circuit 5 are supplied to the b-adjacent code generating circuit 6 which generates the error correction parities each of two symbols for each of the high-ordered information symbol group and the low-ordered information symbol group to thereby constitute the first signal frame. The parity symbols for the high-ordered information symbols are represented by $P_{2i}$ and $Q_{2i}$, while the parity symbols for the low-ordered information symbols are represented by $P_{2i+1}$ and $Q_{2i+1}$ in FIG. 7. The delay circuit 7 generates delays which differ from one to another information word and are equal to both the high- and low-ordered symbols of the same information word. On the other hand, the parity symbols are delayed in such a manner that delays differing between the types of the parities P and Q and from those of the information symbols but equal among the parities for the high-ordered information symbols as well as among the parities for the low-ordered information symbols are produced. The series of symbols combined differently from those of the first signal frame are supplied to the CRC code generating circuit 8 to have a CRC code serving as the second parity code added thereto, whereby the second signal frame is constituted and subsequently outputted. In this connection, it is also to be noted that the amounts of delay imparted to the individual symbols in the delay circuit 7 are never restricted to the values indicated in FIG. 7 so far as the requisite conditions are met, as in the case of the embodiment shown in FIG. 5.

Figure 8:
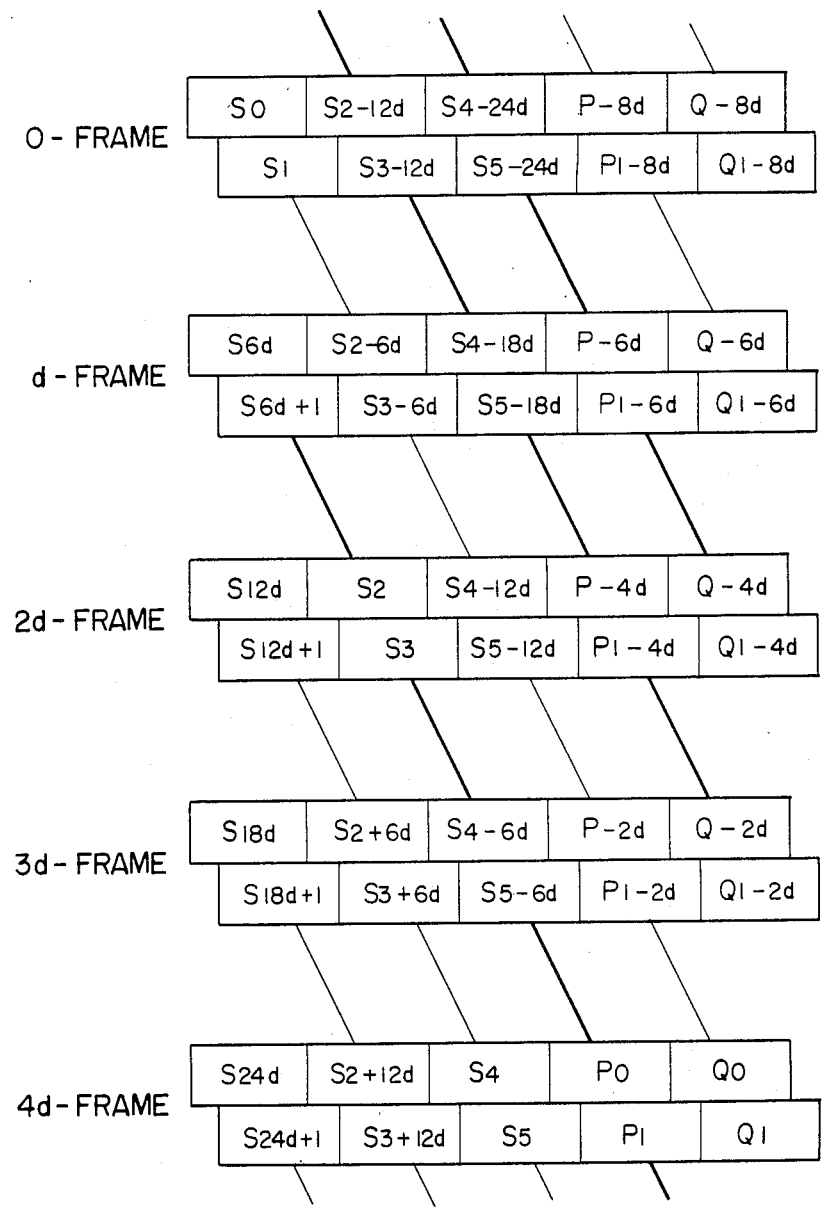
FIG. 8 is a view for illustrating uncorrectable instances in the digital signal encoding system shown in FIG. 7.

Next, the effects or operational advantages brought about by the embodiment shown in FIG. 7 will be elucidated by referring to FIG. 8. The first parity code in concern in the embodiment shown in FIG. 7 is constituted by the b-adjacent code of two symbols. Accordingly, two or less errors of the high-ordered and low-ordered information symbols can be corrected by the P and Q parity symbols. Referring to FIG. 8, the second signal frames are constituted by those symbols interconnected by inclined or diagonal lines, respectively. The detection of error in the second signal frame can be effected by the CRC code. The first signal frames are shown as arrayed horizontally. It will be seen that in the first signal frame, a block is constituted by three high-ordered symbols each of an information word and the b-adjacent codes $P_{2i}$ and $Q_{2i}$, while another block is constituted by three low-ordered information symbols and the associated b-adjacent codes $P_{2i+1}$ and $Q_{2i+1}$.

Assuming now that error is detected in three second signal frames, i.e. the second signal frame including $S_{6d}$, $S_{6d+1}$, $S_2$, $S_3$ and so on, the second signal frame including $S_{2-12d}$, $S_{3-12d}$, $S_{4-18d}$, $S_{5-18d}$ and so on and the second signal frame including $S_{4-24d}$, $S_{5-24d}$, $P_{-6d}$, $P_{1-6d}$ and so on. This means that three symbol errors are produced in four blocks in total comprising the high-ordered symbol blocks and the low-ordered symbol blocks in the d-frame and the 2d-frame, these errors being consequently uncorrectable. More specifically, the six symbols $S_{6d}$, $S_{4-18d}$, $S_{6d+1}$, $S_{5-16d}$, $S_2$ and $S_3$ can not be corrected. In this connection, it is noted that each of the pairs of symbols $S_{6d}$ and $S_{6d+1}$, $S_{4-18d}$ and $S_{5-18d}$, and $S_2$ and $S_3$ results from the same information word. Accordingly, the uncorrectability of the six symbols means that the three words uncorrectable. In the system according to the instant embodiment, error is necessarily detected for the symbols resulting from the same information word. Besides, the same number of erroneous symbols are present in the high-ordered symbol block and the low-ordered symbol block of the first signal frame. Accordingly, the uncorrectability makes an appearance in a pair, one in the high-ordered symbol and the other in the low-ordered symbol in the same information word. In this way, according to the embodiment shown in FIG. 7, the number of generated information words to be error-concealed is reduced to a half of the number of the information symbols which are uncorrectable.

In the embodiment described above in conjunction with FIG. 7, combinations of other type codes may be employed to similar advantageous effects, as in the case of the system illustrated in FIGS. 5 and 6.

As will be appreciated from the foregoing description, there has been provided according to the present invention a digital signal transmission system applied to a digital audio system and the like in which the number of the information words which are uncorrectable and subjected to error-concealment can be decreased, to thereby allow the degradation in the reproduced sound quality to be minimized even when there should arise numerous code errors, while assuring the improved correction capability and a reduced scale of the decoding circuit by processing the information words in the form of divided symbols.

We claim:

1. A digital signal processing method in which digital information words each divided into a plurality of information symbols are, for transmission, combined with sets of code error detecting and correcting parity words each set being provided for a group including a predetermined number of said information symbols, and each of said parity word sets having a first parity word destined primarily to serve for correction of a code error and a second parity word destined primarily to serve to detection of the code error, comprising the steps of:

generating as a first parity word at least a parity symbol created on the basis of each of first groups each having said predetermined number of information symbols which result from the division of original digital information words to be transmitted into information symbols, said first group including information symbols not belonging to the same original information words and combining the generated first parity words with the first groups of information symbols, respectively;

delaying the information symbols of said first group each combined with said first parity word on a basis of an information word in such a manner that second groups of information symbols are arranged which differ from said first groups of information symbols, each second group including all the information symbols belonging to the same original digital information words and the first parity word; and generating from said second groups of information symbols produced by said delaying step a second parity word by calculating information symbols of each of said second groups.

2. A digital signal processing method according to claim 1, wherein said first parity words include m parity symbols, the n-th parity symbol being generated from a predetermined number of n-th information symbols among information symbols produced by division of each of said original digital information words into n information symbols.

3. A digital signal processing method according to claim 2, wherein each group of the n information symbols for generating said m parity symbols includes information symbols resulting from a division of the same original digital information words.

4. A digital signal processing method according to claim 1, wherein said second parity word is generated on the basis of a combination of the information symbols and the first parity symbols which are rearranged by interleaving so as to form a combination of the individual information symbols from which said first parity symbols are generated and said first parity symbols.

5. A method of transmitting a digital information signal formed of a plurality of sequences of information symbols, each symbol being of a predetermined bit length with each such sequence of symbols occurring in a respective input channel, and with check words included in the transmitted signal to enable correction of errors occurring in the signal as a result of transmission, an analog signal being sampled by a sampling frequency and converted into a digital signal as a sample word, said sample word including a plurality of such symbols, comprising the steps of:

(a) applying a first frame of symbols, taken one from each such input channel, each symbol in the first frame being selected from a different sample word and having a first arrangement state, to a first error-correcting code encoder to generate a series of first check words;

(b) delaying each of the symbols in said first frame and each of the first check words by a respective different delay time, in a unit of the sample word, so as to provide a second frame of symbols in a second arrangement state, which includes the first check words and all symbols produced by dividing each sample word;

(c) applying said second frame of symbols to a second error-correcting code encoder to generate a series of second check words; and (d) transmitting said second frame of symbols together with said second check words.

6. A method of transmitting a digital information signal according to claim 5, wherein said step of applying the first frame of symbols includes delaying the symbols of at least certain ones of the input channels by an amount different from any delay imparted to the symbols of the remaining input channels prior to the application thereof to said first error correcting code encoder.

* * * * *